US006862800B2

(12) United States Patent
Yamamoto et al.

(10) Patent No.: US 6,862,800 B2
(45) Date of Patent: Mar. 8, 2005

(54) METHOD FOR CONNECTION OF COATED LEAD WIRE TO TERMINAL OF COIL BOBBIN

(75) Inventors: Kazukiyo Yamamoto, Oume (JP); Yoshiaki Tanabe, Nishitama-gun (JP)

(73) Assignee: Taga Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/606,738

(22) Filed: Jun. 27, 2003

(65) Prior Publication Data

US 2004/0020030 A1 Feb. 5, 2004

(30) Foreign Application Priority Data

Jul. 1, 2002 (JP) ...................................... 2002-192655

(51) Int. Cl.[7] .............................................. H01R 43/00
(52) U.S. Cl. ............................. 29/680; 29/861; 29/860; 29/857; 29/840; 29/602.1; 228/175
(58) Field of Search ................................ 29/602.1, 885, 29/825, 840, 860, 861, 863, 868, 857; 219/110, 56.21; 228/175, 179.1, 258, 110.1; 336/192, 198

(56) References Cited

U.S. PATENT DOCUMENTS

| 3,500,533 A | 3/1970 | Sparling |
| 5,497,936 A | 3/1996 | Vojta et al. |
| 6,100,782 A | * 8/2000 | Kitagawa et al. ........... 336/192 |
| 6,125,533 A | * 10/2000 | Warner et al. ................ 29/868 |
| 6,209,776 B1 | * 4/2001 | Kurogi et al. .............. 228/175 |
| 6,671,952 B2 | * 1/2004 | Ono ............................. 29/860 |
| 2003/0010813 A1 | * 1/2003 | Nakaya ...................... 228/245 |

FOREIGN PATENT DOCUMENTS

| DE | 27 39 418 | 3/1979 |
| JP | 8-88116 | * 4/1996 |
| JP | 10-134925 | 5/1998 |

\* cited by examiner

*Primary Examiner*—Minh Trinh
(74) *Attorney, Agent, or Firm*—Wenderoth, Lind & Ponack, L.L.P.

(57) ABSTRACT

A coated lead wire can be solidly connected to a terminal of a coil bobbin by placing the terminal entwined with the coated lead wire into between electrodes having heating portions, and supplying electric current to the electrodes to heat the terminal entwined with the coated lead wire along with solder to melt the solder and burn off a coating layer of the coated lead wire while exerting pressure against to the terminal entwined with the coated lead wire, and directing a blow of inert gas toward the terminal entwined with the coated lead wire between the electrodes. The coating layer carbonized as the result of being burned out by heating up the electrodes can be blown out without being mixed into the molten solder, consequently to add strength to the connection between the lead wire and the terminal, to thereby form a reliable and firm connection between the lead wire and the terminal with ease.

6 Claims, 3 Drawing Sheets

METHOD FOR CONNECTION OF COATED LEAD WIRE TO TERMINAL OF COIL BOBBIN

BACKGROUND OF THE INVENTION

This invention relates to a method for connecting a coated lead wire to a terminal of a coil bobbin in such a state that the coated lead wire is entwined around the terminal.

There has generally been known a method for connecting a coated lead wire to a bare lead wire (corresponding to a terminal) in a coil bobbin or the like, as disclosed in Japanese Patent Application Public Disclosure HEI 10-134925(A).

To be specific, in the conventional coil structure, the bare lead wire around which the coated lead wire is wound is previously coated with tin (Sn) serving as a bonding-assistant agent by thermal spray coating or in other ways, or applied with Sn in the form of plating or powder paste. The bare lead wire acting as a heating element is heated with Joule heat produced by being supplied with electricity to melt away the insulating coating and the tin adhered to the bare lead wire.

According to the conventional method for connection of the lead wires, the bare lead wire is in contact with the coated lead wire in such a small area that the coated lead wire cannot be covered with solder. Thus, the conventional method entailed a disadvantage such that the joining strength between the bare lead wire and the coated lead wire could not be fully increased.

Besides, the conventional method has a problem that oxidization possibly caused on the contact surface between the bare lead wire and the coated lead wire due to oxygen in the air in heating the wires interferes with desirable connection therebetween.

OBJECT OF THE INVENTION

An object of the present invention is to provide a method capable of solidly connecting a coated lead wire to a terminal of a coil bobbin, to form reliable and firm connection between the lead wire and the terminal with ease.

Another object of the present invention is to provide a method capable of adding strength to the connection between the lead wire and the terminal by blowing out cinders left after melting away the coating layer with a blow of inert gas to prevent the cinders from being mixed into molten solder.

SUMMARY OF THE INVENTION

To attain the object described above according to the present invention, there is provided a method for connecting a coated lead wire to a terminal of a coil bobbin, which method comprises entwining the coated lead wire around the terminal of the coil bobbin, placing the terminal entwined with the coated lead wire on a solder, putting the terminal entwined with the coated lead wire placed on the solder into between electrodes having heating portions and vertically opposed to each other, supplying electric currents to the electrodes to heat the heating portions for melting the solder while directing a blow of inert gas toward the terminal entwined with the coated lead wire placed on the solder between the electrodes and exerting pressure to the terminal entwined with the coated lead wire between the electrodes, and releasing the pressure exerted to the terminal entwined with the core wire after a lapse of a prescribed period of time from commencement of generating heat at the heating portions of the electrodes and exerting pressure to the terminal entwined with the coated lead wire.

The coated lead wire entwined around the terminal is heated with heat generated by the heating portions of the electrodes to burn off the coating layer of the coated lead wire and simultaneously melt the solder. By directing the blow of inert gas toward the terminal entwined with the lead wire, cinders left after melting away the coating layer of the coated lead wire are blown away so as not to be mixed into the molten solder. Consequently, the coated lead wire and the terminal of a coil bobbin can be solidly connected to form reliable and firm connection between the lead wire and the terminal with ease.

The inert gas blown toward the terminal entwined with lead wire may be nitrogen gas. Use of nitrogen gas as inert gas prevents oxidization of the core wire of the lead wire when soldering and elevates wettability of the contact areas of the lead wire and the terminal.

The aforementioned and other objects and advantages of the invention will become more apparent from the following detailed description of particular embodiments of the invention taken in conjunction with the accompanying drawings.

DETAILED DESCRIPTION OF THE PREFERRED EMBODIMENTS OF THE INVENTION

Figure 1:
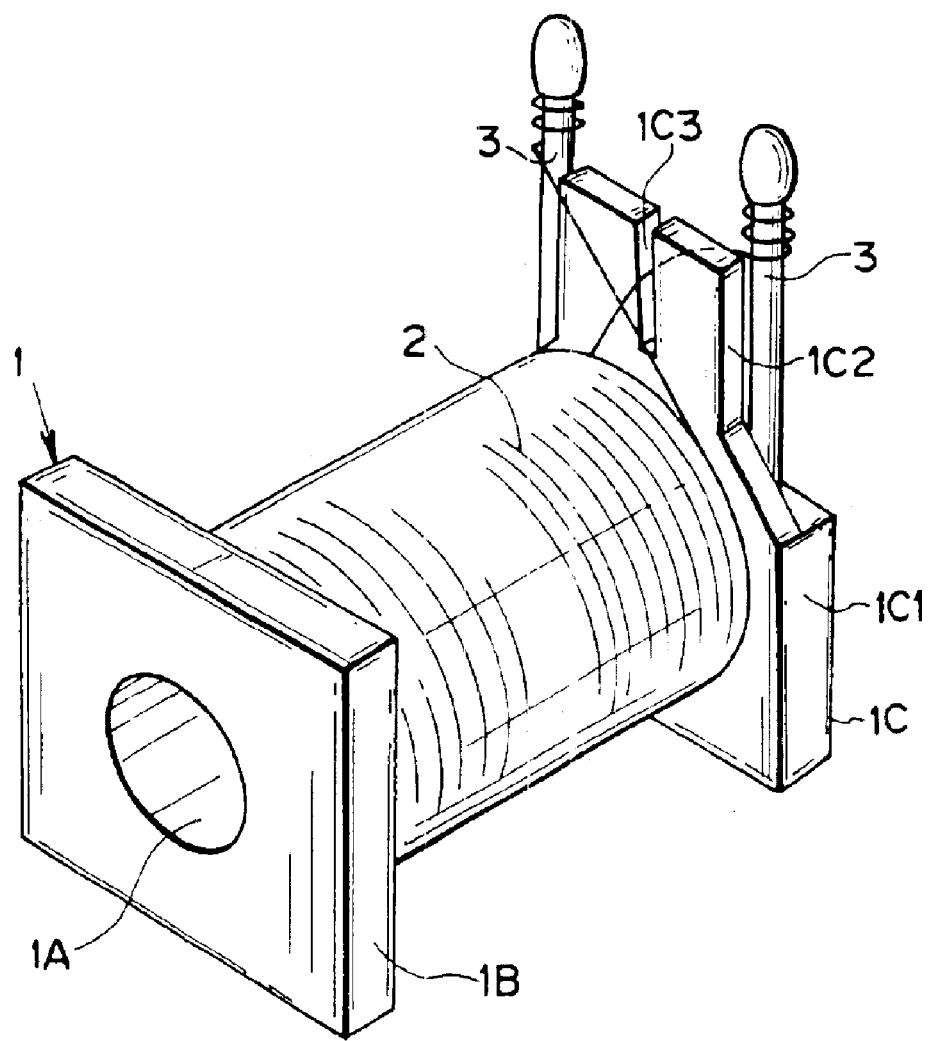
FIG. 1 is a perspective view showing a coil bobbin having a coated lead wire and terminals in an embodiment of the present invention.

The method for connecting a coated lead wire to a terminal of a coil bobbin according to the preferred embodiment will be described hereinafter with reference to FIG. 1 through FIG. 4.

In the accompanying drawings, reference numeral 1 denotes a coil bobbin having a coated lead wire 2 wound therearound. The coil bobbin 1 comprises a cylinder 1A around which the coated lead wire 2 is wound, and plate members 1B and 1C attached integrally to both axial ends of the cylinder 1A. The plate member 1C has a thick plate portion 1C1 and a thin plate portion 1C2 formed on the top of the thick plate portion 1C1. The thin plate portion 1 C2 has an elongated notch 1 C3 shaped in a substantially U-shape.

The coated lead wire 2 may be made of a coated copper wire of about 0.1 mm in diameter by way of example only.

The coated lead wire 2 is formed by covering a core wire 2A with a coating layer 2B.

The conductive core wire 2A is made of copper in this embodiment. In general, the copper melts at a melting temperature of about 1000° C.

The coating layer 2B is an insulating layer having a thickness of about 0.016 mm, which is formed of an insulating coating compound such as of natural resin, synthetic resin or the like. For instance, the coating layer made of epoxy resin or polyurethane resin has a low heat-resisting property, and can thus easily melt at a relatively low temperature of a degree that melts solder.

The coating layer 2B around the contact end portion 2C of the coated lead wire 2 is burned to bare the conductive core wire 2A, as noted below. Thus, only the conductive core wire 2A exposed from the contact end portion 2C of the coated lead wire 2 is entwined around the terminal 3.

Reference numeral 3 denotes a terminal extending from the plate member 1C of the coil bobbin 1. The coil bobbin 1 has generally one pair of terminals 3 disposed apart from each other widthwise on both side portions of the thick plate portion. The terminal 3 may be made of brass, phosphor bronze and/or other conductive materials of about 0.3 to 0.6 mm in diameter byway of example. One of the contact end portions of the lead wire 2 is entwined directly around one of the terminals 3, and the other contact end portion of the lead wire 2 is entwined around the other terminal 3, passing through the notch 1C3.

Denoted by 4 is solder applied to the tip portion of the terminal 3. As the solder 4, there may be used lead-free solder consisting of about 3% to 5% of silver, about 0.5% of copper, and about 94.5% to 96.5% of tin and having a diameter of about 0.3 mm to 1.0 mm The solder is melted and attached to the tip portion of the terminal 3 so as to entirely embrace the tip portion of the terminal therewith, consequently to steadily connect the coated lead wire 2 with the terminal 3.

Next, a production device for connecting contact end portions of the coated lead wire 2 with the terminals 3 of the coil bobbin 1 will be described with reference to FIG. 2.

Denoted by 5 is an upper movable electrode. The movable electrode 5 is formed of a substantially U-shaped plate of tungsten or the like and connected to an upper electric source 6. This movable electrode 5 is movable in the vertical direction indicated by the arrows A and A' shown in FIG. 2 by means of an upper moving mechanism (not shown). The movable electrode 5 has a heating portion 5A arranged parallel to the terminal 3. The heating portion 5A generates heat with application of electric current from the electric source 6.

Reference numeral 7 denotes a lower movable electrode opposed to the upper movable electrode 5. Similarly to the upper movable electrode 5, this lower movable electrode 7 is formed of a substantially U-shaped plate and connected to a lower electric source 8 and can move in the vertical direction indicated by the arrows B and B' shown in FIG. 2 by means of a lower moving mechanism (not shown). The lower movable electrode 7 has a heating portion 7A arranged opposite to the heating portions 5A of the upper movable electrode 5 parallel to the terminal 3. The heating portion 7A generates heat with application of electric current from the electric source 8. Thus, by supplying the electric currents from the electric sources 6 and 8 respectively to the heating portion 5A and 7A of the movable electrodes 5 and 7, the terminal 3 with the coated lead wire 2 is heated up to about 500° C.

Reference numeral 9 denotes a nitrogen gas supply tube for supplying inert gas toward the tip portion of the terminal 3 of the coil bobbin 1. From the nitrogen gas supply tube 9, nitrogen gas is supplied toward the tip portion of the terminal 3 with the coated lead wire 2 as indicated by the arrows C in FIG. 2, while heating the terminal 3 with the coated lead wire 2 under pressure, consequently to prevent oxidization of the coated lead wire 2 and carbonization of the coating layer 2B as the result of burning the coating layer 2B, as described in detail below.

The method of joining together the coated lead wire 2 and the terminal 3 of the coil bobbin 1 by use of the aforementioned production device will be described hereinafter.

First, the movable electrodes 5 and 7 respectively connected to the electric sources 6 and 8 are placed vertically opposite to each other. Then, the movable electrodes 5 and 7 are moved in the respective directions indicated by the arrows A and B' in FIG. 2 by operating the moving mechanisms, so as to assure a gap accommodating the terminal 3 and solder 4 between the heating portions 5A and 7A. (Electrode placing step)

Then, the end portion of the coated lead wire 2 is entwined around the terminal 3 of the coil bobbin 1. (Wire entwining step)

Subsequently, the terminal 3 of the coil bobbin 1 around which the coated lead wire 2 is wound is placed on the solder 4. Then, the terminal with coated lead wire 2 and the solder 4 together are put into between the heating portions 5A and 7A of the movable electrodes 5 and 7. (Terminal positioning step)

Next, nitrogen gas is blown toward the tip portion of the terminal 3 with the coated lead wire 2, which is placed between the movable electrodes 5 and 7. (Nitrogen-gas supplying step)

Figure 2:
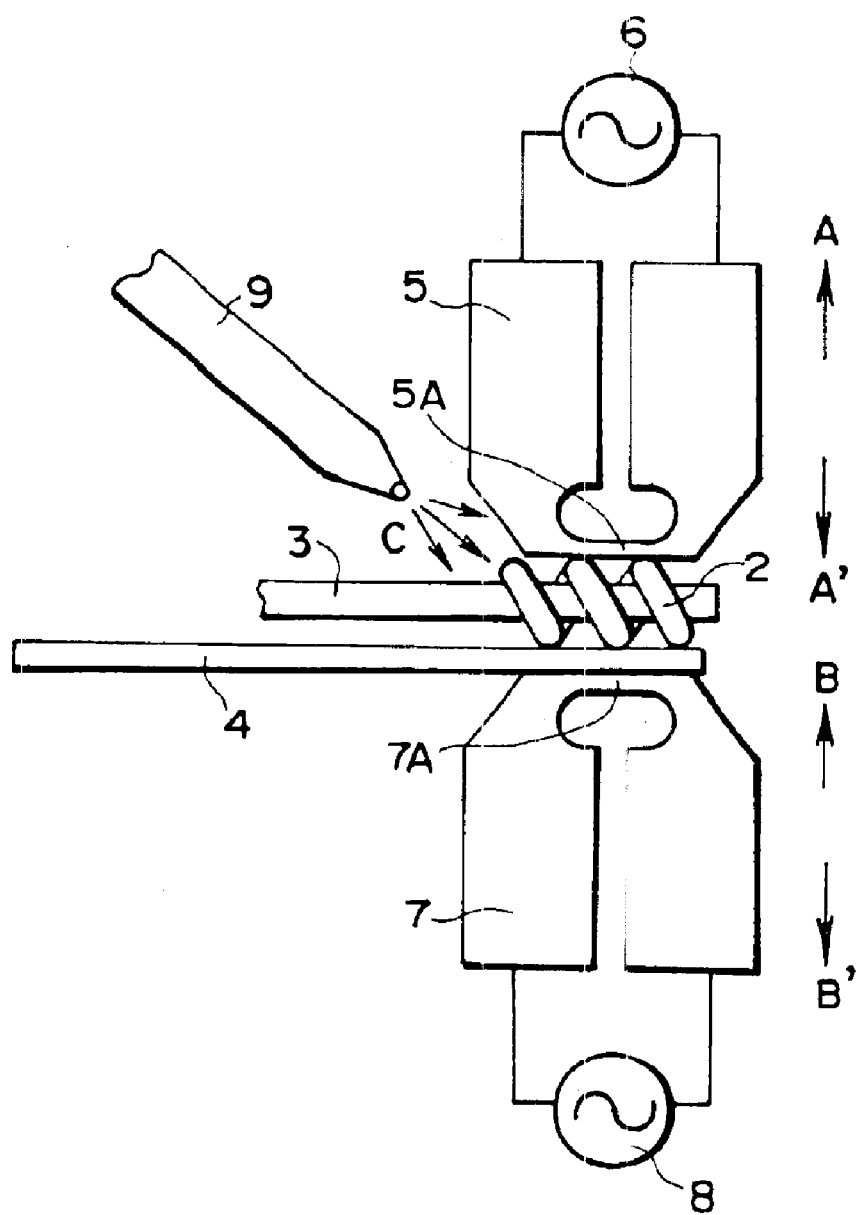
FIG. 2 shows a production device for connecting contact end portions of the coated lead wire with the terminals of the coil bobbin in the embodiment of the present invention.
Figure 3:
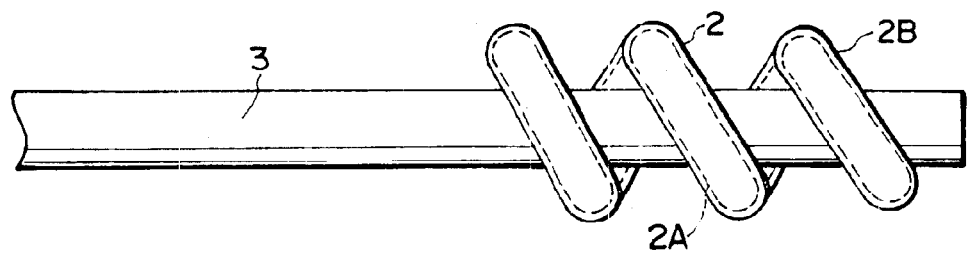
FIG. 3 is an enlarged view showing the state of entwining the coated lead wire around the terminal of the coil bobbin in the embodiment of the present invention.

In this state, the movable electrodes 5 and 7 are moved in the directions indicated by the arrows A' and B in FIG. 2 to put the terminal 3 with the coated lead wire 2 and the solder 4 between the heating portions 5A and 7A of the movable electrodes 5 and 7, bringing pressure on the terminal and solder, and then, by supplying electric currents from the electric sources 6 and 8 to the respective movable electrodes 5 and 7, the heating portions 5A and 7A of the movable electrodes 5 and 7 are heated. (pressurizing and electricity-supplying step)

As a result, the coating layer 2B of the coated lead wire 2 is melted away and the solder 4 is melted, consequently to join the core wire 2A of the lead wire 2 and the terminal 3 with the solder 4. At this time, a blow of nitrogen gas is given from the nitrogen gas supply tube 9 toward the terminal 3 placed between the heating portions 5A and 7A, consequently to prevent the core wire 2A of the lead wire 2 from oxidizing and the molten coating layer 2B from carbonizing.

When the terminal 3 and the core wire 2A are joined together with the solder 4 as noted above, cinders left after melting away the coating layer 2B of the lead wire 2 are ejected out from the connection point of the terminal and the core wire and eventually exchanged with the solder 4. (coating-cinder ejecting step)

Finally, the pressure exerted to the connection point of the terminal and the core wire is released after the lapse of a prescribed period of time from commencement of heating under pressure with the movable electrodes 5 and 7. (Pressure-releasing step)

Figure 4:
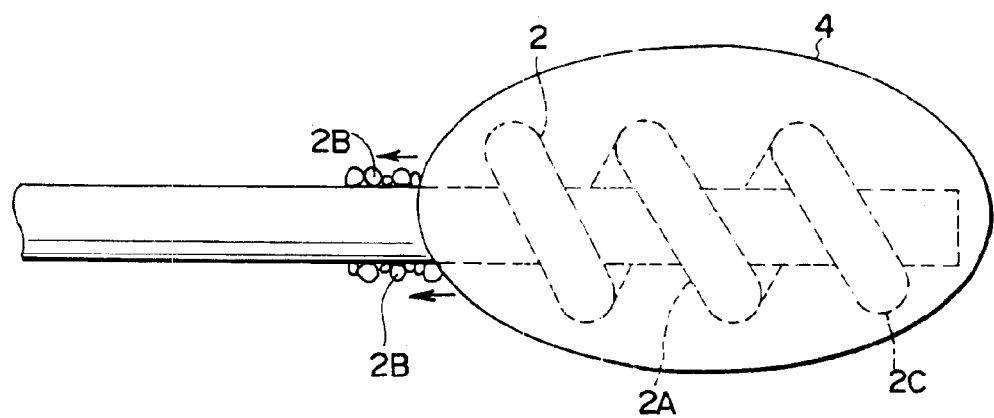
FIG. 4 is an enlarged view showing the state of applying solder to the connection portion of the coated lead wire and the terminal of the coil bobbin of the present invention.

Consequently, the solder 4 melted with the heat generated by the movable electrodes 5 and 7 embraces the entire connection point of the terminal 3 entwined with the core wire 2A of the lead wire 2 as illustrated in FIG. 4. The connection between the terminal 3 and the lead wire 2 can resultingly be enforced.

That is, the mechanism for supplying nitrogen gas toward the terminal 3 and the solder 4 placed between the movable electrodes 5 and 7 while heating makes it possible to effectively prevent the core wire 2A of the lead wire 2 from oxidizing and the molten coating layer 2B from carbonizing. Thus, the coating layer 2B carbonized as the result of being burned out by heating up the moving electrodes can be blown out without being mixed into the molten solder 4. Consequently, the purity of the solder 4 can be increased, to thereby add strength to the connection between the lead wire 2 and the terminal 3.

The nitrogen gas is used as one example of inert gas in the foregoing embodiment, but instead, argon gas may be used.

As is apparent from the foregoing description, according to the present invention, the coated lead wire and the terminal of a coil bobbin can be solidly connected to form a reliable and firm connection between the lead wire and the terminal with ease. Since the coating layer carbonized as the result of being burned out by heating up the moving electrodes can be blown out without being mixed into the molten solder, the purity of the solder can be increased, to thereby add strength to the connection between the lead wire and the terminal. Use of nitrogen gas as inert gas prevents oxidization of the core wire of the lead wire when soldering and elevates wettability of the contact areas of the lead wire and the terminal.

While the invention has been explained by reference to particular embodiments thereof, and while these embodiments have been described in considerable detail, the invention is not limited to the representative apparatus and methods described. Those of ordinary skill in the art will recognize various modifications which may be made to the embodiments described herein without departing from the scope of the invention. Accordingly, the scope of the invention is to be determined by the following claims.

What is claimed is:

1. A method for connecting a coated lead wire to a terminal of a coil bobbin, comprising; placing a pair of electrodes having heating portions opposite to each other; entwining said coated lead wire around said terminal of said coil bobbin; placing said terminal entwined with said coated lead wire against a solder; putting said terminal entwined with said coated lead wire placed against said solder into between said electrodes; directing a blow of inert gas toward said terminal entwined with said coated lead wire placed against said solder between said electrodes; supplying electric currents to said electrodes to heat said heating portions for melting said solder while exerting pressure to said terminal entwined with said coated lead wire between said electrodes; and releasing the pressure exerted to the terminal entwined with said lead wire after a lapse of a prescribed period of time from commencement of generating heat at said heating portions of said electrodes and exerting pressure to said terminal entwined with said coated lead wire.

2. The method for connecting a coated lead wire to a terminal of a coil bobbin according to claim 1, wherein cinders left after melting a coating layer of said coated lead wire with heat generated by said heating portions of said electrodes are blown out with said blow of inert gas.

3. The method for connecting a coated lead wire to a terminal of a coil bobbin according to claim 2, wherein said inert gas is nitrogen gas.

4. The method for connecting a coated lead wire to a terminal of a coil bobbin according to claim 1, wherein said inert gas is nitrogen gas.

5. The method for connecting a coated lead wire to a terminal of a coil bobbin according to claim 1, wherein said placing of said electrodes opposite to each other comprises placing said electrodes vertically opposite to each other.

6. The method for connecting a coated lead wire to a terminal of a coil bobbin according to claim 1, wherein said placing of said terminal entwined with said coated lead wire against a solder comprises placing said terminal entwined with said coated lead wire on said solder.

* * * * *